April 7, 1964 C. A. V. SMITH ETAL 3,127,960

PANEL SYSTEMS

Filed Sept. 21, 1959 7 Sheets-Sheet 1

INVENTOR
CHARLES AQUILA VINCENT SMITH
ALBERT FRANCIS REKERT
BY
Larson and Taylor
ATTORNEY INVENTOR
CHARLES AQUILA VINCENT SMITH
ALBERT FRANCIS REKERT
BY
Lowry and Taylor
ATTORNEY INVENTOR
CHARLES AQUILA VINCENT SMITH
ALBERT FRANCIS REKERT
BY
Larson and Taylor
ATTORNEY April 7, 1964 C. A. V. SMITH ETAL 3,127,960
PANEL SYSTEMS
Filed Sept. 21, 1959 7 Sheets-Sheet 4
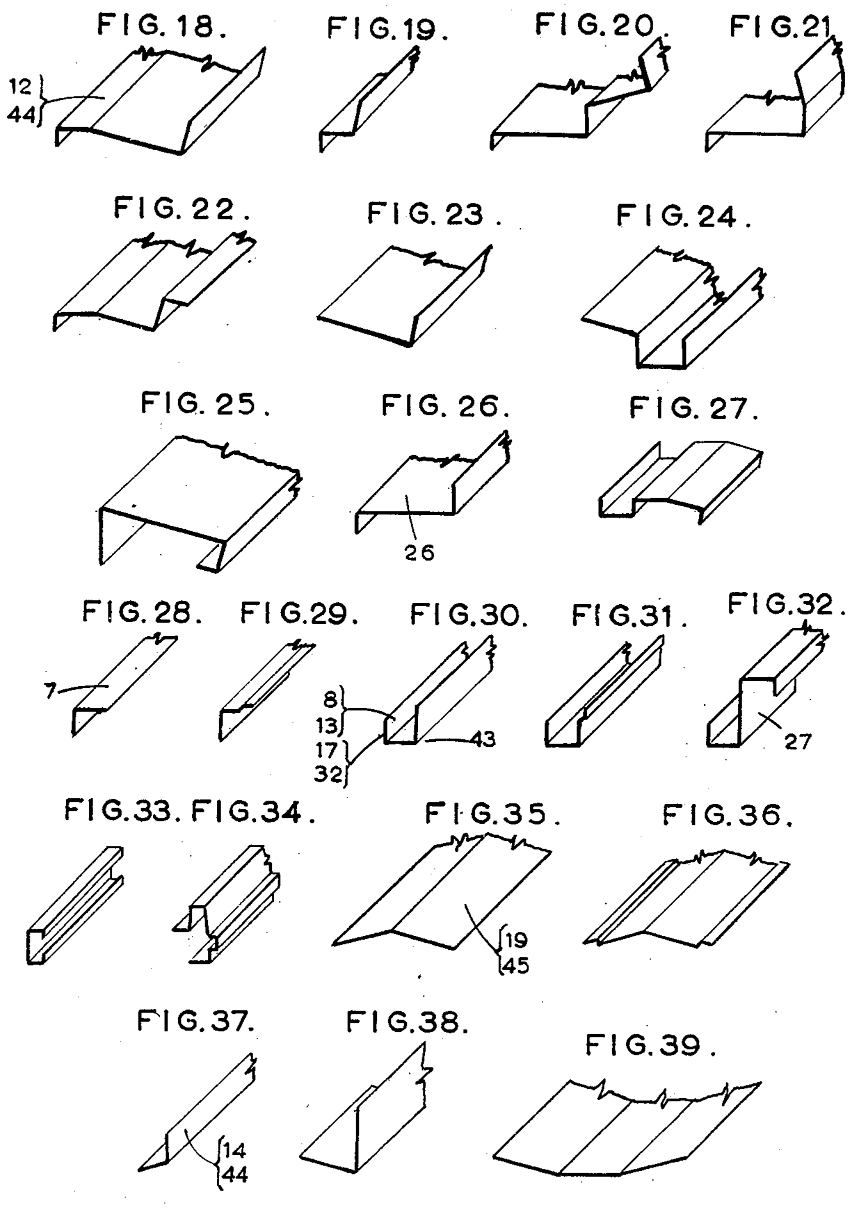
FIG. 18. FIG. 19. FIG. 20. FIG. 21. FIG. 22. FIG. 23. FIG. 24. FIG. 25. FIG. 26. FIG. 27. FIG. 28. FIG. 29. FIG. 30. FIG. 31. FIG. 32. FIG. 33. FIG. 34. FIG. 35. FIG. 36. FIG. 37. FIG. 38. FIG. 39.
INVENTOR
CHARLES AQUILA VINCENT SMITH
ALBERT FRANCIS REKERT
BY
Lawson and Taylor
ATTORNEY

PANEL SYSTEMS

Filed Sept. 21, 1959 7 Sheets-Sheet 5

INVENTOR
CHARLES AQUILA VINCENT SMITH
ALBERT FRANCIS REKERT
BY
Larson and Taylor
ATTORNEY INVENTOR
CHARLES AQUILA VINCENT SMITH
ALBERT FRANCIS REKERT
BY Larson and Taylor
ATTORNEY

PANEL SYSTEMS

INVENTOR
CHARLES AQUILA VINCENT SMITH
ALBERT FRANCIS REKERT
BY
Lawson and Taylor
ATTORNEY United States Patent Office 3,127,960

Patented Apr. 7, 1964

3,127,960

PANEL SYSTEMS

Charles Aquila Vincent Smith, 50 Knightsbridge Court, Sloane St., London SW. 1, England, and Albert Francis Rekert, 194 Croydon Road, Beckenham, England Filed Sept. 21, 1959, Ser. No. 841,256
Claims priority, application Great Britain Sept. 24, 1958
8 Claims. (Cl. 189—1)

This invention relates to a modular panel system of building that may be applied generally to the construction of buildings so as to provide the main structural units therefor, such as roofs and walls that do not require an orthodox framed supporting structure, or to provide cladding for orthodox framed structures, also to provide flat, monopitch or double pitched roofs to be mounted on orthodox load bearing walls or structural frames, also curtain walling to cross-wall constructions and frames, as well as internal partitions requiring no additional supports.

One object of the invention is to provide a particularly simple modular panel system of building. A further object is to provide panel assemblies that are either "post-tensioned" or "pre-stressed," the term "post-tensioned" meaning that the webs of the panel assemblies are stressed after being incorporated in a structure and the term "pre-stressed" meaning that the webs of the panel assemblies are under stress before being incorporated in a structure. Another object is to provide panel assemblies of substantial span to be applied to framed supporting structures having fewer purlins or sheeting rails than are generally necessary for clad structures. Yet other objects are to provide roof panel assemblies that do not require any trusses or other supports nor any waterproofing finish, and to provide panel assemblies that furnish ready support for wall and roof linings, thereby reducing the cost of such linings.

It is to be understood that, although the invention is concerned with panel assemblies, and with buildings incorporating such assemblies, it also includes sets of parts for fabricating such assemblies, whether or not the parts are drilled or punched ready for attachment to one another, such drilling or punching, where necessary, being readily effected at any time prior to the actual erection of the building where suitable plant or equippment is available.

According to the invention, an assembly of members for use in building construction includes a number of panels each provided along opposite edges with flanges, both on the same face of the panel, means for securing the adjacent flanges of adjacent panels together, and anchoring or stiffening members, such as channel members or angle members, extending along the edges of the panels that lie transversely to the panels. When it is desired to post-tension or pre-stress the panels, the panels are so fixed to the anchoring or stiffening members and the flanges are so arranged that, when the flanges are secured together, they are pulled together so as to put the panels under tension. Thus, each panel may be secured at a central point at each end to the anchoring or stiffening members. At least one of the flanges, in each pair thereof that are bolted together, instead of being at right angles to its associated panel, may be at a slightly greater angle, for example 95°, so that the two flanges provide between them a narrow V-shaped recess, there being a small gap between the flanges at the base of the V to enable the panels to be drawn together as aforesaid and to provide for thermal expansion. Sealing material, which is preferably of a resilient nature, may be inserted between the flanges at the open end of the V, after the flanges are drawn together by the bolts. This setting of the flanges enables a pack of such panels to be stacked together quite closely, face to back for transport. The precise angle of the V-shaped recess depends on the coefficient of thermal expansion of the material used. One of the flanges on each panel may be stiffened by an out-turned margin.

In an alternative arrangement both flanges are formed with out-turned margins so that the margins of flanges on adjacent panels overlap and so that an open channel is provided between the panels, a support member being arranged to lie in the channel so formed, and means being provided for securing the support member in the channel. It is to be understood that the invention is not limited to metal panels, but these may be made of other materials, such as asbestos-cement, capable of being formed or moulded to the required shape. However, asbestos-cement is not suited to tensile pre-stressing because of its weakness in bending, and the flanges can be arranged to take the main loads in the capacity of stanchions and rafters. These asbestos-cement panels may be moulded with V-shaped ribs, parallel to the flanges, to assist in taking the loads.

In order that the invention may be clearly understood and readily carried into effect, assemblies in accordance therewith will now be described, by way of example, with reference to the accompanying drawings, in which:

FIGURES 6 to 39 are perspective views showing the ends of various structural units;

Figures 2, 3:
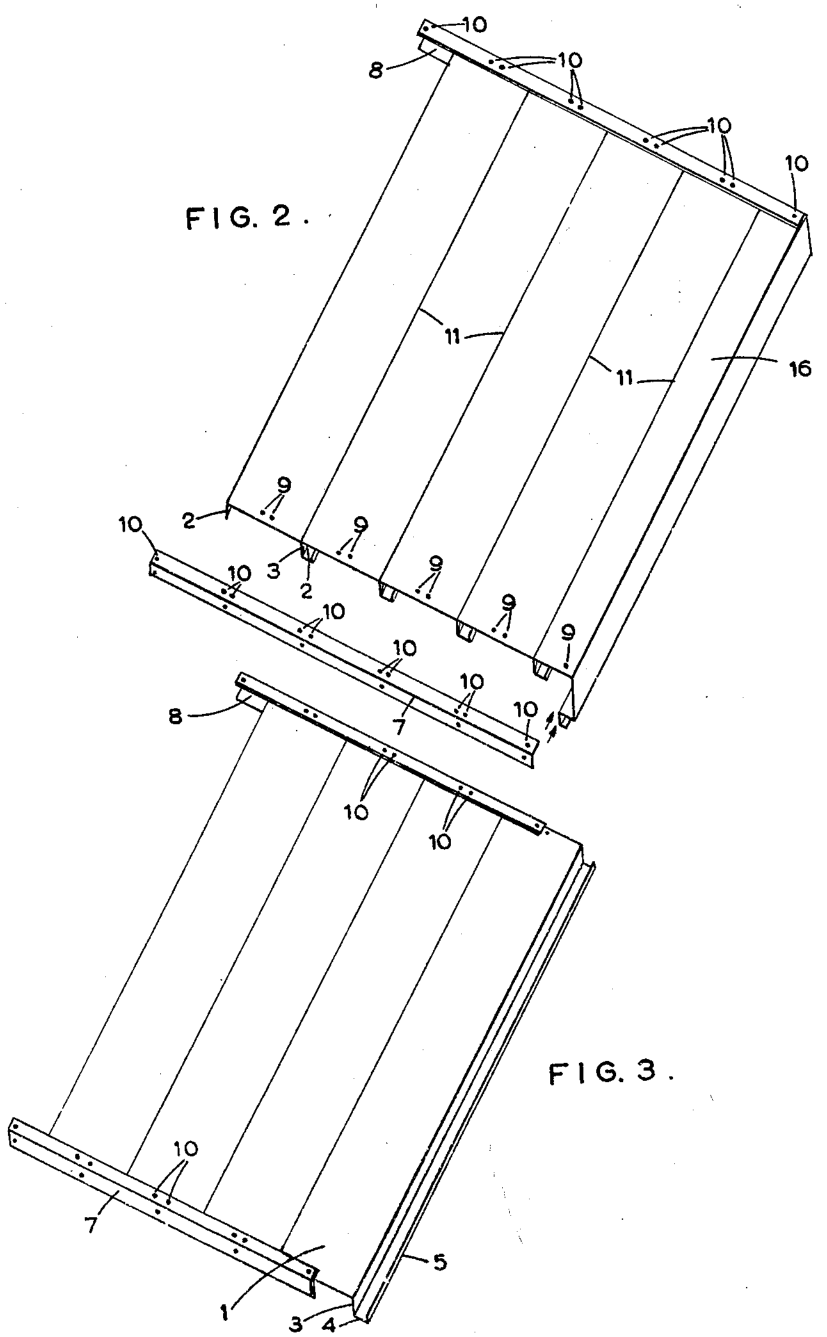
FIGURE 3 is a perspective view showing a modification of the assembly of FIGURE 2.
Figures 6, 7, 8:
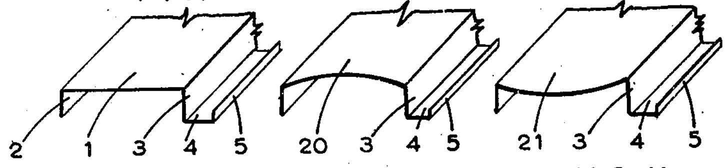

FIGURE 6 shows one form of panel for use in accordance with the invention. This panel 1 is formed with two flanges 2, 3. The flange 3 is at right angles to the panel and the flange 2 makes with the panel an angle slightly in excess of a right angle. The flange 3 is formed with a margin 4 parallel to the face of the panel, and the margin 4 is stiffened by a lip 5. A number of these panels are assembled together in the way shown in FIGURES 2 and 3 and the flange 2 on one panel is attached to the flange 3 on the next panel by bolts (not shown) that are passed through holes at the points 6, the nuts on the bolts being left loose. A row of panels, thus assembled, is secured, as shown in FIGURES 2 and 3, along the edges at right angles to the flanges to an angle member 7 (FIGURE 28) and a channel member 8 (FIGURE 30). For this purpose each panel 1 is formed at opposite ends with a single central hole or group of holes 9, which registers with a hole or group of holes 10 in the angle member 7 or the channel member 8. The actual fixing is effected by nuts and bolts that are passed through the pairs of holes 9, 10. After the members 7, 8 have been securely fixed, the nuts and bolts in the flanges 2, 3 are tightened so as to put the panels under tension and stretch them slightly. This stretching is best performed after the panels are built into a building. It can, however, be done partially prior to the incorporation of the panels into a building. Thus a post-tensioned or pre-stressed panel assembly is fabricated. Strips 11 of mastic are inserted, as by injecting with a gun or by a putty knife, between the flanges in each pair 2, 3.

Figures 1, 4:
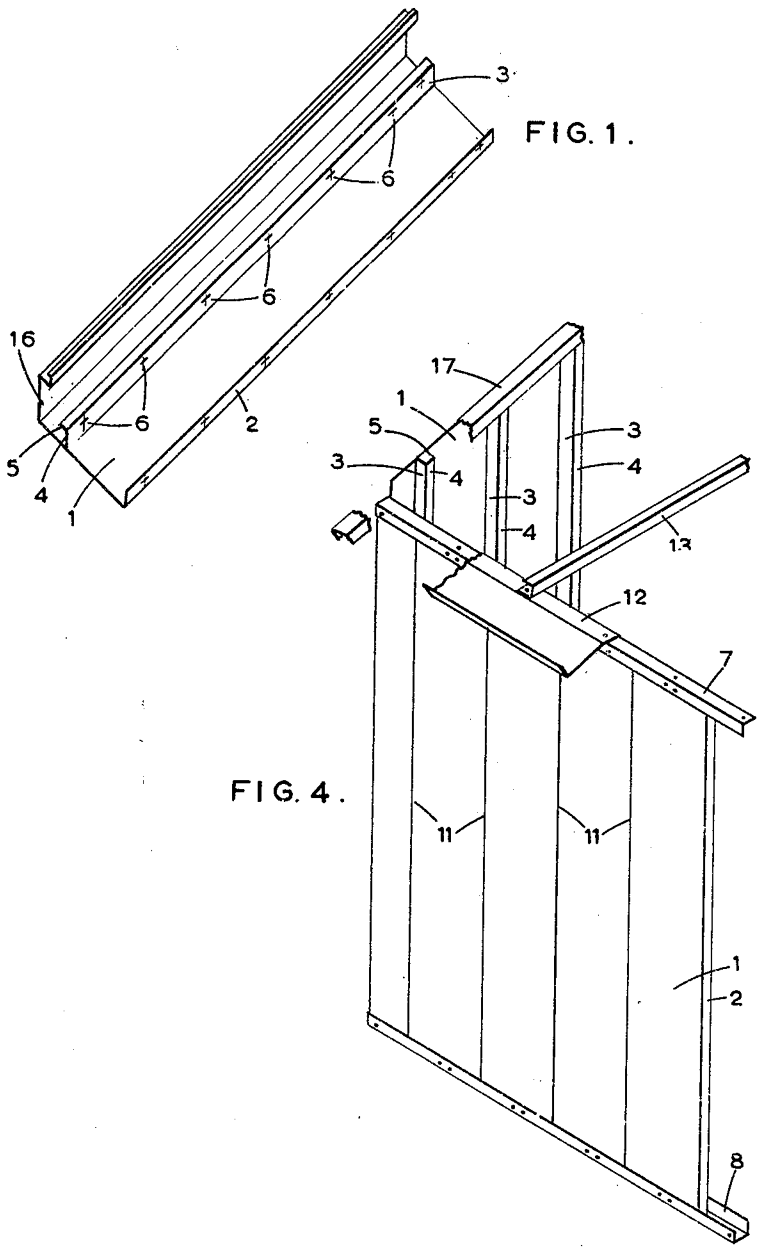
FIGURES 1 and 2 are perspective views showing two stages in the formation of a panel assembly.
FIGURES 4 and 5 are perspective views of portions of buildings.

FIGURE 4 shows the way in which such a prefabricated assembly may be used as the wall of a building. It will be noted that the channel member 8 is lowermost and this may be used for supporting the bottom edge of any lining material. Such lining material is secured to the margins 4.

The pre-stressed assemblies constituting the walls of the building are bolted to the foundations and may be bolted to panel assemblies at an angle thereto through the medium of corner pieces 16 (FIGURES 1 and 12), which may take any one of the forms described below. Eaves filler components 12 (FIGURE 18) are next bolted to the tops of the walls and then ties 13 (FIGURE 30) across the building are fixed, using temporary supports under the centres of the ties. Roof assemblies, which are similar to the wall assemblies, are mounted between the components 12 and two sections 14 (FIGURE 37) joined back to back to form a ridge piece in the shape of an inverted Y. The roof panel assemblies are bolted to the two flanges thus formed, and the sections 14 may form splice plates to the angle members 7 of the panel assemblies. Sag bars 15 to the roof ties are now fixed. The ridge capping 19 (FIGURE 35) is next fixed. This provides weather protection and can also act as a thrust transmitter. Sag bars 15 to the roof ties 13 are now fixed. Finally any temporary supports are removed. It is to be understood, however, that the stress bearing properties of the roof panel assemblies are such that, in certain circumstances, roof ties and sag bars, such as 13 and 15, may be omitted.

FIGURES 7 and 8 show modified panels that respectively have convex and concave single curvatures 20, 21. Owing to these curvatures these panels cannot be prestressed or post-tensioned unless the members 7, 8 are formed to curves corresponding to the curvature of the panels.

The margins 4 and lips 5 are not essential to the panels of FIGURES 6, 7 and 8 and may be provided by separate L- or U-section members bolted to ehe members 7, 8 only when it is desired to attach lining material to the panel assemblies. Such lining material may simply be for the usual decorative or insulating purposes. If additional strength is required, the reinforcement may be provided by panels such as those shown in FIGURES 9, 10 and 11 which, in addition to the margin 4 and lip 5 on the flange 3, are provided with a margin 22 and lip 23 on the flange 2. These margins 4, 22 are bolted to the margins 4 in a panel assembly such as that shown in FIGURE 3 so as to provide internal reinforcements to the wall or roof unit constituted by the assembly.

Figures 12, 13, 14, 15, 16, 17:
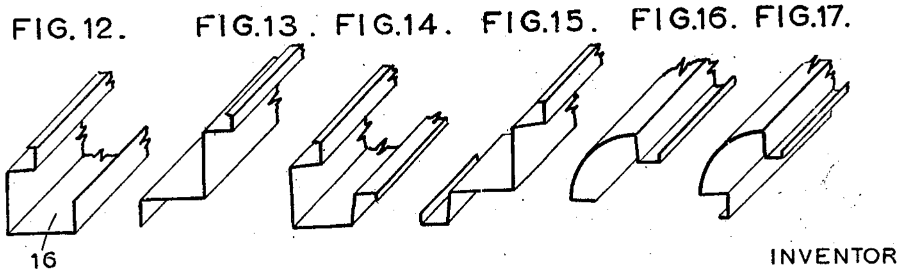
Figure 40:
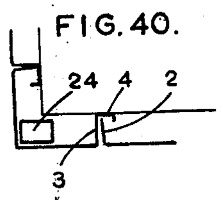
FIGURES 40 to 44 are cross-sections through details of construction.
Figure 41:
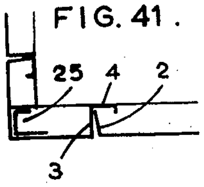

It will be seen that the sections of FIGURES 12 and 13 are the same as that of FIGURE 6, except that the panels are formed with right angle blends to provide corner pieces (see also FIGURE 1). In view of the greater stresses that these pieces may have to bear, they may be made of thicker material than the panels of FIGURES 6 to 11 or, alternatively, the corners may be reinforced by a tube 24 or a channel section 25 as shown in FIGURES 40 and 41.

Figures 9, 10, 11:
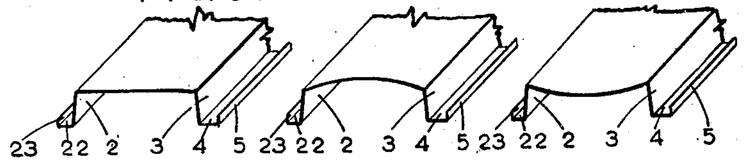

FIGURES 14 and 15 show corner pieces similar to those on FIGURES 12 and 13, but based on the panel of FIGURE 9 and intended to be used in the same way; that is to say, as internal reinforcements.

FIGURES 16 and 17 show corner pieces similar to those of FIGURES 12 and 14 but intended to be used only where a rounded shape is required. These are not stress resisting members and either require internal reinforcement by tube or channel sections appropriately shaped, or must be used with adjoining wall panels (FIGURE 6) that are sufficiently strong in themselves to form anchorages.

The sections of FIGURES 18 to 23 and FIGURE 25, which include the eaves filler component 12 already mentioned, may be used for a variety of purposes in the same building such as horizontal beams to prevent the bending of the wall panel assemblies, splice plates to cover butt joints of adjoining angle members 7 or channel members 8, joints between roofs and walls, and means for sealing eaves against dust and insects. Certain of these sections may be used at the tops of masonry and like walls when it is desired to mount panel assemblies in accordance with the invention as roofing carried by such walls. In such circumstances the sections fulfill the additional function of distributing the loads over the full thickness of each such wall.

FIGURE 24 shows a section to be used solely as an eaves gutter.

Figure 42:
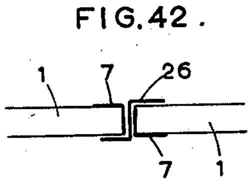

FIGURE 26 shows a section 26 for joining two panel assemblies end to end as shown in FIGURE 42, the two angle section members 7 being juxtaposed.

FIGURE 27 shows a component to be used as a weather bar over a window. Generally speaking this is only useful for the lower windows in two-story buildings. The weather bar is fitted to a channel member 8 when used as a door or window frame.

FIGURES 29, 31 and 36 show members that are identical with the members 7, 8 and 19, except that offsets are swaged or formed to facilitate the insertion of mastic when thicker material is used.

The channel member 8 or 13 shown in FIGURE 30 has further uses besides those described above with reference to FIGURES 3 and 4. It may, for example, be used for door frame or window surrounds. Such surrounds resist the stresses in the adjacent panels and support internal wall linings. In the case of a door frame, the door is hung on one side of the frame and, in the case of a window surround, the window is attached to it. When the panel assemblies are used in the construction of gabled roofs (FIGURE 5), they may be mounted with the channel members 8 along the verges so as to resist stresses and provide a neat finish.

The channel members of FIGURE 30, or angle members of FIGURE 28, may be used as the foundations of temporary buildings, such members being bolted along both sides of channel members 8 at the bottoms of the wall panel assemblies so as ot spread the load over a greater area of ground.

Figure 43:
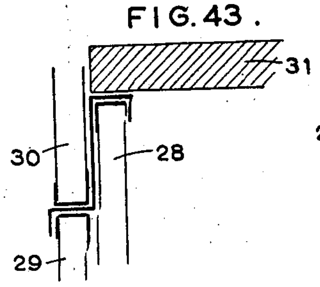

The component 27 shown in FIGURE 32 is used, as shown in FIGURE 43, to hook over the inner wall panel assembly 28 of a double wall, and to rest on the outer wall panel assembly 29, which is not so tall as the assembly 28. Above the assembly 29, the component 27 supports a wall panel assembly 30 for a single walled upper story. Flooring 31 may be supported by the inner wall panel assemblies 28.

FIGURE 33 shows a member that may be used as a secondary lintel over a window. It is arranged to extend along the top of the window.

FIGURE 34 shows a door frame or window surround that may be used as an alternative to the section of FIGURE 30.

Figure 5:
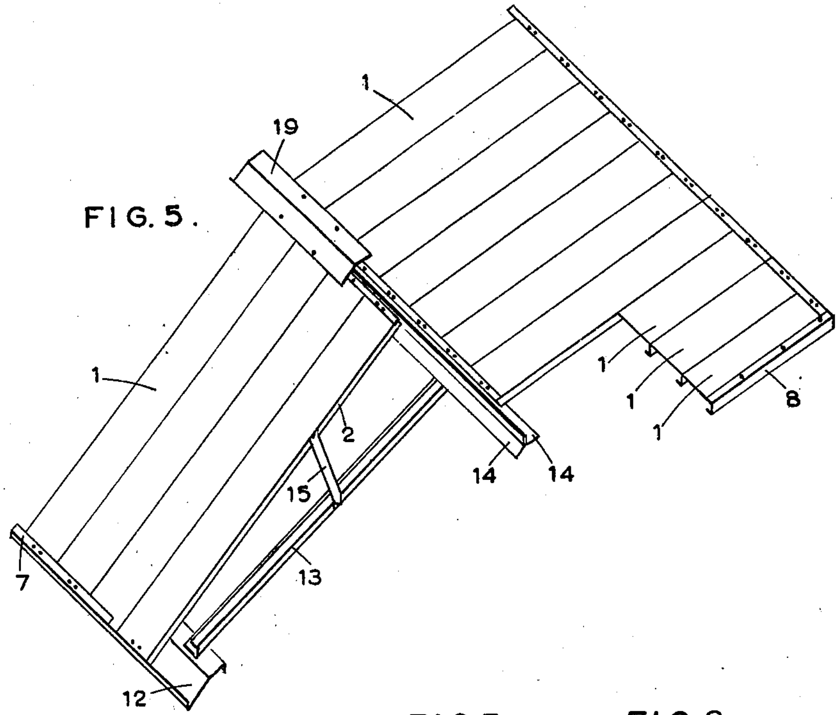

The section 14 of FIGURE 37, in addition to being used as described with reference to FIGURE 5, can be used to reinforce the junction between the roof and walls in a two pin portal building (i.e. a building in which the roof is hinged at opposite edges to the walls), or in a three pin portal building (i.e. a building in which the roof is composed of two parts hinged together along the ridge and the walls are hinged to the foundations).

Two sections 14 of FIGURE 37 can also be used back to back to form a hip to a roof when it is only necessary to change the bending angle.

Referring to the section of FIGURE 38, two of these may be joined back to back to form a valley. Alternatively such sections may be used individually to strengthen the outsides of the wall and roof junctions in two and three pin portal buildings. FIGURE 39 shows a further method of forming a valley.

In an alternative method of constructing a building according to the invention, the roof is first built up from the roof panel assemblies on a frame structure made of tubes or of channel members as shown in FIGURE 30. The walls are next built up under the roof. The panel assemblies may also be arranged as varandas or car ports, extending out from a building and supported by square, rectangular or round tubes, channel members or other convenient columns.

Where it is desired to provide flooring, a series of panels assembled as described with reference to FIGURE 3, are mounted face downwards resting on supports at their ends and at such intermediate positions as may be necessary and floor boards are placed across the margins 4. Then the floor boards counter torsion and the flanges act as joists.

Figure 44:
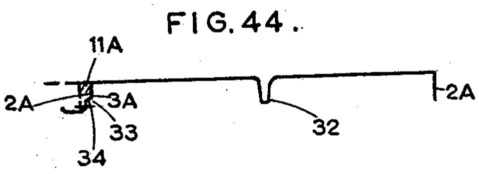

FIGURE 44 shows a cross section through an asbestos cement panel which, owing to the lack of strength of asbestos cement under bending, cannot be post-tensioned or pre-stressed. It may, therefore, be provided with a central reinforcing rib 32 of the shape shown, parallel to the flanges 2*a*, 3*a*. The flange 3*a* is set at right angles to the panel and, in order to accommodate the mastic 11*a*, it is formed with a double bend 33. The flange 3*a* is bolted to the flange 2*a* on the adjacent panel at 34. The panel of FIGURE 44 can be made wider between the flanges 2*a*, 3*a* than the post-tensioned or pre-stressed metal panels and the ribs 32 and flanges 2*a*, 3*a* can serve as stiffeners, stanchions or rafters.

The building of FIGURES 45 to 50 will now be described. The building materials consist of eight different kinds of component, each made of sheet metal such as steel or aluminium, but some or all of them could be made of other sheet material having the requisite structural strength and water-resistant qualities, for example, panels could be made of a laminated plastic or laminated composition board. The principal components are panels. In its simplest form a panel 40 (FIGURE 49) is constituted by a rectangular sheet having each of its two longer parallel sides turned over to form flanges 34 providing a shallow U cross-section, with the free ends of the U turned outwardly to provide margins 35. The internal angles of the U are 95° each, so that the U has a slightly wider mouth than base. Such panels 40 may be of any desired width or length, but for a given type of building the offset marginal portions (i.e. the flanges 34 and margins 35) will be of standard dimensions.

When two such panels 40 are placed side by side (FIGURE 46) with their margins 35 contiguous and slightly overlapping, there is formed between the panels an open channel which also has the mouth slightly wider than the base thereof. This channel forms the basis for a joint.

Another standard component comprises a support member 36 (FIGURES 46 and 49) termed a "joint filler." This constitutes a hollow member of box-like cross-section so dimensioned that it will lie in the open channel and very nearly fill the mouth thereof. In the spaces between the sides of the joint filler 36 and the flanges 34 there are placed two resilient strips 37 (FIGURE 46) of sealing material. The joint filler 36 and the panels are provided with jig-drilled holes which are arranged to be in register to admit passage of a bolt 38 (FIGURE 46) which passes through the side of the joint filler 36 which is in the same plane as the main portions of the panels 40 and also through the overlapping margins 35 of the panels, so that when the bolt 38 is inserted and tightened from the inside (the side where the margins 35 overlap), not only are the two panels 40 held against displacement in their common plane but the joint filler 36 is drawn into the wedge-shaped open channel and compresses the resilient sealing strips 37 until, when the nut 39 is fully tightened, the joint filler and the offset portions (i.e. the flanges 34 and margins 35) constituting the open channel together form a rigid hollow supporting member. The location of the jig-drilled holes and the bolts 38 may be at whatever intervals are necessary, bearing in mind the size of the building to be constructed.

We have, therefore, now two panels 40 extending side by side in a common plane and united by rigid means constituting a hollow box structural member. It will be seen that a third and a fourth panel may be added as necessary, and therefore that as large a surface as is required may be built up merely by the use of the two types of component shown in FIGURES 48 and 49. The rigidity of such a surface will be considerable owing to the box-like structure of the supporting members. Such an assembly of panels may be employed for the complete wall of a building or for part of a roof, as shown in FIGURE 45.

Figure 45:
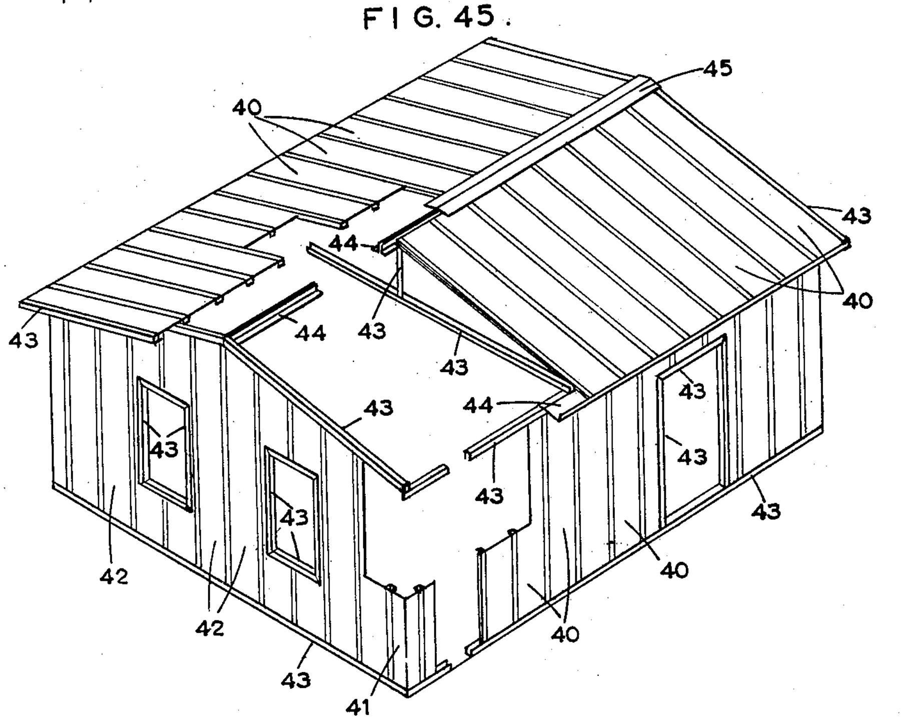
FIGURE 45 is a perspective view of a building shown partly in section.

Assuming that four such walls have been constructed, these are united into a rectangular structure by the use of a third type of component 41 (FIGURE 50) which may be regarded as exactly similar to the panel already described except that down its median line it is folded at 90° (as shown at the front corner of FIGURE 45). It will be seen, therefore, that such a component 41 constitutes a corner sheet but its edges are secured to neighboring panels in exactly the same fashion as if it were itself one of the flat panels.

To provide for the pitched roof of FIGURE 45, there are two types of panel required, the first, 40, as already described, being rectangular, and the second, 42, having two parallel sides formed with the offset portions, a third side at right angles to the two aforesaid sides and forming the bottom edge of the panel, and the fourth side being cut off at the angle required to constitute a support for the pitched roof.

In addition to the components already described, a universal capping 43 in the form of a channel member as shown in FIGURE 30 is employed in various locations in the building. The interior width of the channel member 43 is equal to the thickness of the box member formed by the uniting of two offset portions of panels with a joint filler 36.

It will be seen, therefore, that to erect the walls of the building there are first laid out four lengths of channel member 43 with their open sides upwards. These are formed with mitred corners and with any necessary flitch plates for the corners and grouting bolts or other securing means to fix them to the ground. Four walls, made up of panels 40, 41, 42, are then erected in the channel members 43 laid out on the ground.

The tops of the walls are finished with the same universal capping 43, but of course, in the inverted position.

The ridge of the roof is constituted by the uniting of two angle sections 44 (FIGURE 37) placed back to back and resting on the tops of the end walls or secured thereto by suitable brackets, the angles forming two ledges on which rest the ends of assemblies of rectangular panels 40 made up as hereinbefore described. The other ends of the panels 40 rest on the channel members 43 which surmount the side walls, but between this capping and the roof assemblies there is laid an eaves filler 44 as shown in FIGURE 18. When the roof panels have been placed in position, a ridge capping 45 (FIGURE 35) is placed over them.

Roof trusses may be provided as required, and these consist merely of channel members 43.

Door and window apertures are provided by preshaping certain of the panels as required. For example, two panels each formed with a retangular recess midway along its length will, when placed side by side with their recesses meeting, form an aperture, the edges of which are further defined by lengths of universal capping, i.e. channel members 43.

Gutters may be provided by the component of FIGURE 24.

It will be appreciated that although one form only of securing has been mentioned; namely the use of a nut and bolt on the open channel and joint filler (FIGURE 46), nuts and bolts may be used in all other parts of the building (FIGURE 45) where junctions are to take place and the holes may be pre-drilled and, if necessary, the nuts may be welded to the components in standard positions so that it is merely necessary to locate the parts, enter the bolts and tighten them up. A building of standard size and shape may therefore be made from a basic eight components, which themselves are further codified into panels or fillers of varying lengths, and it will be apparent that a building of considerable size can be exactly constructed from a predetermined set of parts by unskilled labor. The resultant building does not have a framework as such, the framework being constituted by the box effects produced by the mating of the relative offset portions, joint fillers, and universal cappings.

Figures 46, 47:
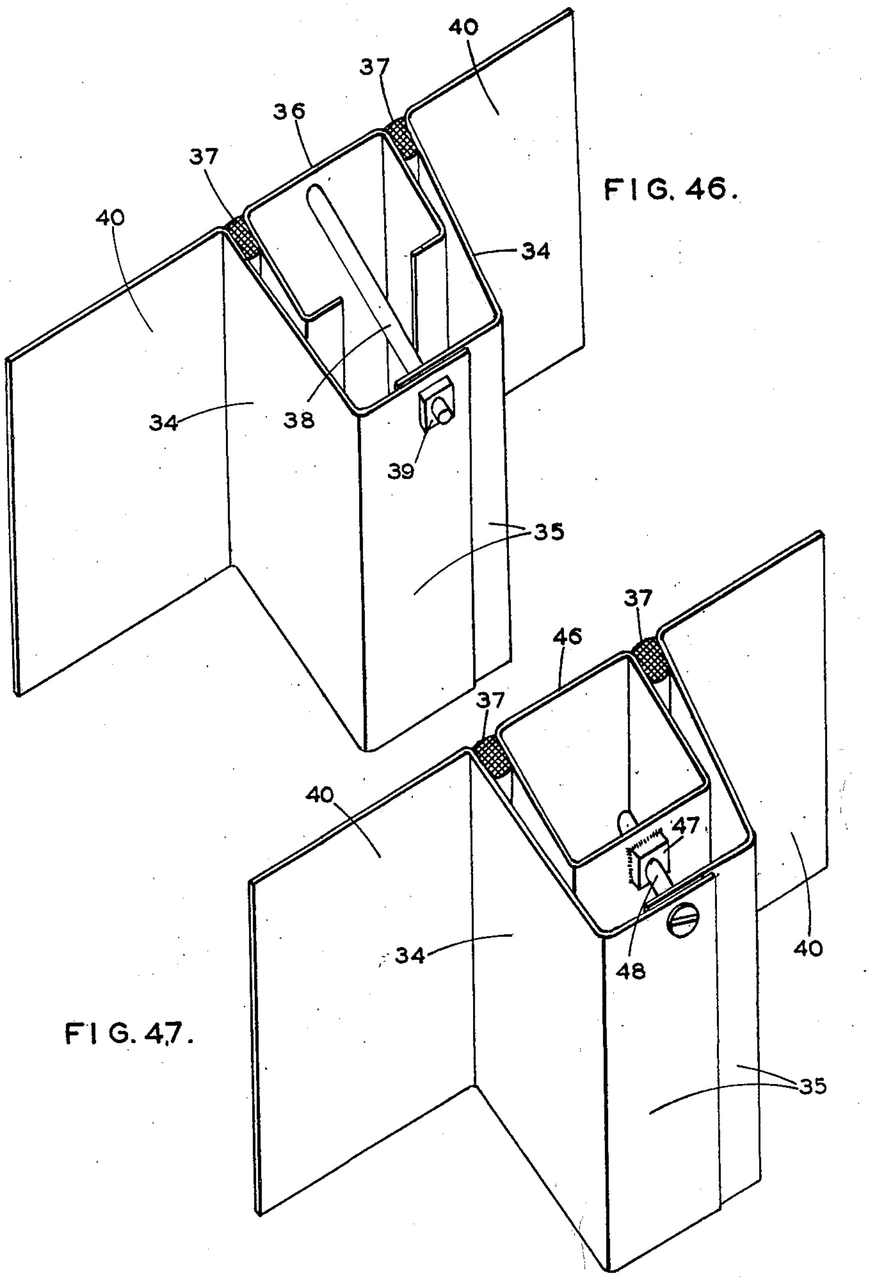
FIGURES 46 to 50 are fragmentary perspective views showing details of the building of FIGURE 45.
Figure 48:
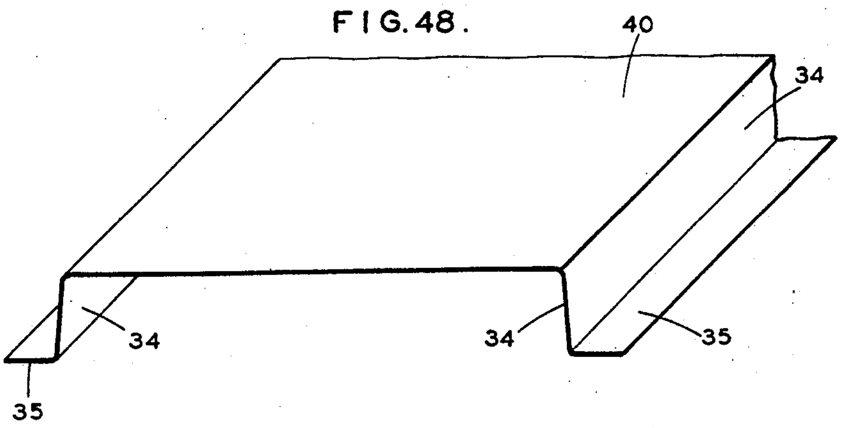
Figures 49, 50:
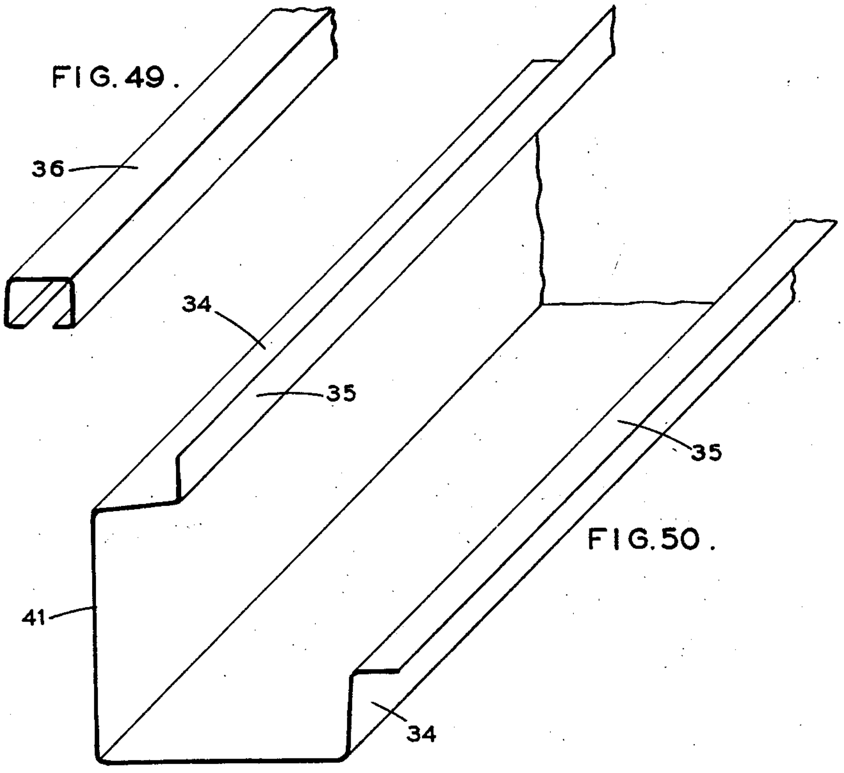

In an alternative embodiment the joint fillers may be of box section as shown at 46 in FIGURE 47, with nuts 47 welded thereon for engagement with screws 48 passing outwardly through the overlapping margins 34 of the panels 40 to engage the nuts 48 and so draw the joint filler 46 into the open channel as previously described. This enables the joint to be entirely concealed insofar as the bolts are concerned, and a relatively smooth outside surface may be achieved by careful location of the resilient sealing strips 37.

It will be clear that various forms of securing means can be used and, in addition, the two sealing strips 37 in a joint may be replaced by a single sheet of waterproofing material gripped between the joint filler 36 or 46 and the open channel and pressed into position during the tightening of the bolts so that it assumes a U shape within the channel.

We claim:

1. A panel assembly for use in building construction as a major portion of the fabric of a building without additional framework coextensive with the assembly, the assembly comprising a number of co-planar panels, each having flanges integrally formed along at least two opposite edges, both flanges on each panel extending in the same direction therefrom, a narrow, unitary stiffening length extending along edges of said panels that lie transversely to said flanges at one end thereof, a second narrow, unitary stiffening length extending along edges of said panels that lie transversely to said flanges at the other end thereof, means for attaching said stiffening lengths to said panels at isolated points distributed along said stiffening lengths in a manner which permits separation of adjacent flanges of adjacent panels, means, for joining the adjacent flanges together so as to internally stress said panels in the plane thereof, thereby eliminating play in the joints between said panels and in the joints between said panels and said unitary lengths, whereby a rigid assembly for use as an independent unit in building construction is provided.

2. An assembly according to claim 1, in which each panel is secured at a central point at each end to one of said stiffening lengths, and in which said panels are adapted for said flanges of adjacent panels to be pulled together by said joining means so as to put said panels under tension.

3. An assembly according to claim 2, in which one of said adjacent flanges is at right angles to its respective panel and the other at an angle slightly greater than a right angle.

4. The assembly described in claim 1 wherein the flanges are adapted to provide a V-shaped channel between adjacent flanges, the channel being widest at the face of the panel.

5. An assembly according to claim 1, in which each of the panels is formed with a slight curvature between straight lines thereon at which said flanges are formed, the panels together forming a generally flat structure.

6. A building having walls comprising panel assemblies as described in claim 1, and further comprising window and door apertures defined in said assemblies, and lengths of channel section overlapping the panels around the periphery of the apertures.

7. An assembly of members for use in building construction comprising a plurality of panels each provided with flanges along opposite edges, both substantially at right angles to the face of the panel and both flared outward in the same direction from the face of the panel, stiffening members extending along the ends of said panels that lie transversely to said flanges and secured to said panels only at central points at the ends of said panels, and means for securing adjacent flanges of adjacent panels together by pulling said flanges together in a manner to put said panels under tension, one of the flanges on each panel being formed at its outer extremity with a margin lying substantially parallel to the panel, and the other flange on the panel being a simple flange.

8. An assembly according to claim 7, in which the margin is bent with its free edge towards the plane of the panel to provide a lip.

References Cited in the file of this patent

UNITED STATES PATENTS

| | | |
|---|---|---|
| 141,929 | Hegeler et al. | Aug. 19, 1873 |
| 1,178,491 | Clasen | Apr. 11, 1916 |
| 1,469,321 | Kramer | Oct. 2, 1923 |
| 1,885,330 | Cherdron | Nov. 1, 1932 |
| 2,065,920 | Clark | Dec. 29, 1936 |
| 2,067,252 | Whelan | Jan. 12, 1937 |
| 2,158,234 | Greibsch | May 16, 1939 |
| 2,244,649 | Carpenter | June 3, 1941 |
| 2,376,728 | Shaer | May 22, 1945 |
| 2,449,292 | Gillett | Sept. 14, 1948 |
| 2,730,208 | Valentine | Jan. 10, 1956 |

FOREIGN PATENTS

| | | |
|---|---|---|
| 874,655 | Germany | Apr. 27, 1953 |
| 1,148,827 | France | July 1, 1957 |